(12) United States Patent
Hershey et al.

(10) Patent No.: US 6,633,104 B1
(45) Date of Patent: Oct. 14, 2003

(54) METHOD AND APPARATUS FOR ESTIMATING DC MOTOR BRUSH WEAR

(75) Inventors: John Erik Hershey, Ballston Lake, NY (US); Brock Estel Osborn, Niskayuna, NY (US); Deniz Senturk, Schenectady, NY (US); Howard Daniel Koontz, Overland Park, KS (US); Brian Joseph McManus, Helendale, CA (US); Edward James Lewandowski, Chardon, OH (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 10/160,679

(22) Filed: May 31, 2002

(51) Int. Cl.⁷ ............................................... H02K 13/00
(52) U.S. Cl. ........................ 310/242; 310/239; 310/228
(58) Field of Search ................................. 310/242, 239, 310/228, 219, 245, 248, 252, 253

(56) References Cited

U.S. PATENT DOCUMENTS

| | | | | |
|---|---|---|---|---|
| 5,717,271 A | * | 2/1998 | Aoki et al. | 310/242 |
| 5,879,747 A | * | 3/1999 | Murakami et al. | 427/384 |
| 6,232,694 B1 | * | 5/2001 | Leslie | 310/233 |

* cited by examiner

*Primary Examiner*—Thanh Lam

(57) ABSTRACT

An apparatus for estimating DC motor brush wear comprising: a wear element calculator adapted to calculate a plurality of wear elements from at least one environmental variable; a wear element multiplier adapted to multiply the wear elements by respective ones of a plurality of wear coefficients to yield a plurality of weighted wear elements; and a summer adapted to sum the weighted wear elements to yield a brush wear estimate.

12 Claims, 1 Drawing Sheet

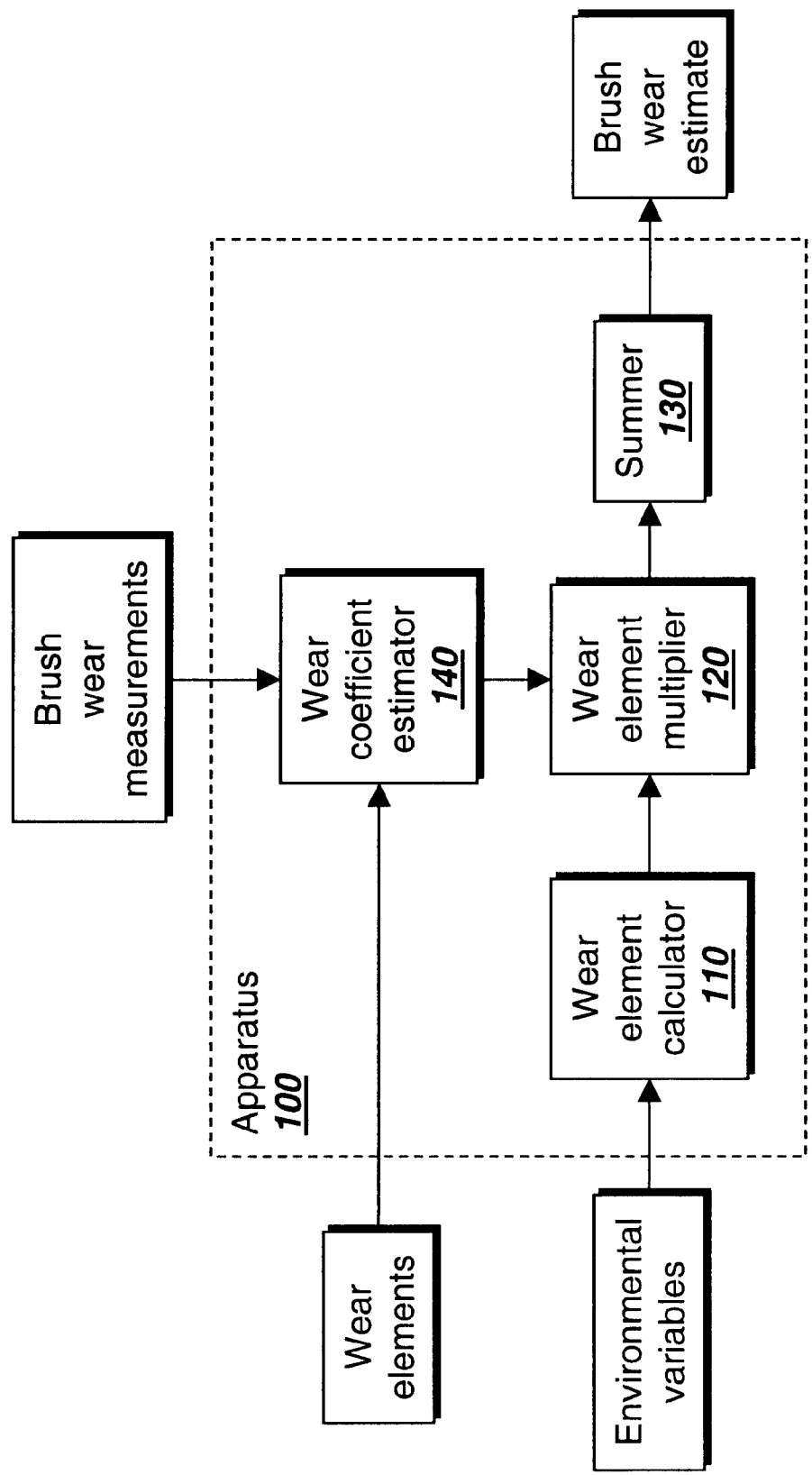

METHOD AND APPARATUS FOR ESTIMATING DC MOTOR BRUSH WEAR

BACKGROUND

The present invention relates generally to the field of direct current ("DC") motors and particularly to the estimation of DC motor brush wear. While this disclosure emphasizes embodiments applicable to diesel-electric locomotives, it will be obvious to one of ordinary skill in the art that embodiments of the present invention are also useful in a wide variety of other contexts.

Diesel-electric locomotives utilizing DC motors make up a significant portion of many railroad locomotive fleets. A DC motor passes current to a rotating mechanical commutator through electrically conductive parts known as brushes. The brushes wear with use, and the amount of brush wear is measurable as the decrease in brush length occurring during a time interval of interest. Neglecting to replace the brushes before they have completely worn out can result in complete motor failure. Such failures, especially when occurring far from a repair shop ("road failures"), can be costly and disruptive of normal railroad operation.

To avoid this cost and disruption, railroads have adopted conservative preventive maintenance policies scheduling brush replacement well before the brushes are likely to be completely worn out. Choosing the timing of scheduled brush replacement, however, can be a difficult task: if too frequent, the cost of labor to remove and install brushes, of lost revenue while the locomotive is out of service, and of the replacement brushes themselves becomes excessive; if too seldom, the cost of road failures becomes excessive. To facilitate brush replacement scheduling, therefore, railroads have considered various approaches to estimating brush wear. These approaches include manual inspection, in service electronic sensing, and estimation from environmental variables ("EEV").

Of these approaches, as conventionally practiced, manual inspection is most accurate, but also labor intensive and therefore most expensive; in service electronic sensing promises intermediate accuracy and intermediate cost, owing to additional sensors and cabling, but is still largely in the experimental stage of development; and EEV, while least expensive to implement and available today, conventionally realizes the poorest accuracy owing to the use of only a single environmental variable, typically locomotive mileage, for the estimation. An opportunity exists to improve the accuracy of brush life EEV by utilizing multiple environmental variables, thereby achieving an accuracy approaching that of manual inspection at a cost approaching that of conventional EEV.

SUMMARY

The opportunity described above is addressed, in one embodiment of the present invention, by an apparatus for estimating DC motor brush wear comprising: a wear element calculator adapted to calculate a plurality of wear elements from at least one environmental variable; a wear element multiplier adapted to multiply the wear elements by respective ones of a plurality of wear coefficients to yield a plurality of weighted wear elements; and a summer adapted to sum the weighted wear elements to yield a brush wear estimate.

DRAWINGS

These and other features, aspects, and advantages of the present invention will become better understood when the following detailed description is read with reference to the accompanying drawings in which like characters represent like parts throughout the drawings, wherein:

The FIGURE illustrates a block diagram of an apparatus for estimating DC motor brush wear in accordance with one embodiment of the present invention.

DETAILED DESCRIPTION

The electrophysics of DC motor brush wear is a complicated matter and it is well known in the art that brush wear is not a function of a single variable. Rather, brush wear depends upon a number of environmental variables including, but not limited to, the manner in which the motor is run, how the pulled load is managed, spring forces pressing the brushes to the commutator, ambient temperature, precipitation, and relative humidity.

In accordance with one embodiment of the present invention, brush wear over a given time interval is estimated by $$W=[(\alpha_N N+\alpha_H H+\alpha_{H2} H^2+\alpha_T T+\alpha_P P)\cdot\Lambda+\alpha_D D+\alpha_S S]\cdot X+\alpha_G G+\alpha_L L, \quad (1)$$

where W is the change in brush length occurring over the time interval; $\alpha_N$, $\alpha_H$, $\alpha_{H2}$, $\alpha_T$, $\alpha_P$, $\alpha_D$, $\alpha_S$, $\alpha_G$, $\alpha_L$ are examples of "wear coefficients," as used herein; N, H, T, P, $\Lambda$, H, S, X, G, L are examples of "environmental variables," as used herein, and are assumed to be either constant during the time interval or average values over the time interval; N is nominal load, the product of train speed and tractive effort (i.e., locomotive pulling force) per "live" (i.e., powered) motor; H is relative humidity; T is ambient temperature; P is a precipitation indicator (P=1, if it is raining or snowing; P=0, otherwise); D is a dead (i.e., unpowered) motor indicator (D=1, if the motor is unpowered; D=0, otherwise); $\Lambda=1-D$ is a live motor indicator; S is an average spring force pushing a brush against the commutator; X is a segment distance traveled by the locomotive; G is gaining grade load, the product of tractive effort per live motor and vertical distance gained when the locomotive is traveling uphill; and L is losing grade load, the product of tractive effort per live motor and vertical distance lost when the locomotive is traveling downhill.

Equation (1) may be re-written as $$W=\alpha_N N\Lambda X+\alpha_H H\Lambda X+\alpha_{H2} H^2\Lambda X+\alpha_T T\Lambda X+\alpha_P P\Lambda X+\alpha_D DX+\alpha_S SX+\alpha_G G+\alpha_L L \quad (2)$$

As used herein, the terms $N\Lambda X$, $H\Lambda X$, $H^2\Lambda X$, $T\Lambda X$, $P\Lambda X$, DX, SX, G, L are referred to as "wear elements." While being non-linear in the environmental variables, Equation (2) is linear in the wear coefficients. Consequently, estimates of the wear coefficients may be obtained by linear regression. As there are nine wear coefficients to be estimated, the linear regression requires at least nine data sets where each data set comprises a brush wear measurement and a set of nine wear elements corresponding to the brush wear measurement.

In accordance with one embodiment of the present invention, the FIGURE illustrates a block diagram of an apparatus 100 for estimating DC motor brush wear. Apparatus 100 comprises a wear element calculator 110, a wear element multiplier 120, a summer 130, and a wear coefficient estimator 140. In operation, wear element calculator 110 calculates a plurality of wear elements from at least one environmental variable. In some embodiments, the environmental variable is selected from a group consisting of: segment distance, nominal load, relative humidity, ambient temperature, precipitation indicator, dead motor indicator, live motor indicator, average spring force, gaining grade load, and losing grade load, as defined hereinabove. Wear element multiplier 120 multiplies the wear elements by respective wear coefficients to yield a plurality of weighted wear elements, and summer 130 sums the weighted wear elements to yield a brush wear estimate. Wear coefficient estimator 140 estimates the wear coefficients by linear regression on a data set comprising a plurality of wear elements and a plurality of brush wear measurements.

As used herein, "environmental variable" denotes any characteristic or property of the motor or the motor's environment that can be measured and that may be relevant to brush wear. Examples of environmental variables include, without limitation, N, H, T, P, Λ, D, S, X, G, L as described hereinabove.

As used herein, "wear element" denotes any function of one or more environmental variables. Examples of wear elements include, without limitation, NΛX, HΛX, $H^2 \Lambda X$, TΛX, PΛX, DX, SX, G, L as described hereinabove.

As used herein, "linear regression" denotes any method of computing the wear coefficients so as to minimize an objective function of residuals, where the residuals are the differences between brush wear estimates and brush wear measurements. Examples of objective functions include, without limitation, a sum of squared residuals, a sum of absolute values of the residuals, and the maximum value among the residuals. Examples of linear regression include, without limitation, methods comprising calculating a generalized inverse (the generalized inverse of a matrix A is $[A'A]^{-1} A'$, where A' denotes the transpose of A), recursive least squares estimation, Kalman filtering and extended Kalman filtering.

Wear element calculator 110, wear element multiplier 120, summer 130, and wear coefficient estimator 140 comprise any electrical or electronic device or any combination thereof capable of performing the indicated computations. Examples of wear element calculator 110, wear element multiplier 120, summer 130, and wear coefficient estimator 140 include, without limitation, analog electronic computation modules and digital electronic computation modules (digital computers) including, without limitation, array processors, microcomputers, microprocessors, microcontrollers, and single-chip digital signal processors (DSPs). In typical embodiments, wear element calculator 110, wear element multiplier 120, summer 130, and wear coefficient estimator 140 are implemented in software in a single digital computer.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. An apparatus for estimating DC motor brush wear comprising:
    a wear element calculator adapted to calculate a plurality of wear elements from at least one environmental variable;
    a wear element multiplier adapted to multiply said wear elements by respective ones of a plurality of wear coefficients to yield a plurality of weighted wear elements; and
    a summer adapted to sum said weighted wear elements to yield a brush wear estimate.

2. The apparatus of claim 1 further comprising:
    a wear coefficient estimator adapted to estimate said wear coefficients by linear regression on a data set comprising:
    a plurality of said wear elements; and
    a plurality of brush wear measurements.

3. The apparatus of claim 1 wherein said at least one environmental variable is selected from a group consisting of: segment distance, nominal load, relative humidity, ambient temperature, precipitation indicator, dead motor indicator, live motor indicator, average spring force, gaining grade load, and losing grade load.

4. The apparatus of claim 1 wherein said wear element calculator is further adapted to perform at least one calculation selected from a group consisting of:
    multiplying a nominal load by a segment distance and by a live motor indicator;
    multiplying a relative humidity by a segment distance and by a live motor indicator;
    squaring a relative humidity to yield a squared relative humidity, and multiplying said squared relative humidity by a segment distance and by a live motor indicator;
    multiplying an ambient temperature by a segment distance and by a live motor indicator;
    multiplying a precipitation indicator by a segment distance and by a live motor indicator;
    multiplying a dead motor indicator by a segment distance;
    multiplying an average spring force by a segment distance;
    calculating a gaining grade load; and
    calculating a losing grade load.

5. An apparatus for estimating DC motor brush wear comprising:
    a wear element calculator adapted to calculate a plurality of wear elements from at least one environmental variable selected from a group consisting of: segment distance, nominal load, relative humidity, ambient temperature, precipitation indicator, dead motor indicator, live motor indicator, average spring force, gaining grade load, and losing grade load;
    a wear element multiplier adapted to multiply said wear elements by respective ones of a plurality of wear coefficients to yield a plurality of weighted wear elements;
    a summer adapted to sum said weighted wear elements to yield a brush wear estimate; and
    a wear coefficient estimator adapted to estimate said wear coefficients by linear regression on a data set comprising:
    a plurality of said wear elements; and
    a plurality of brush wear measurements.

6. The apparatus of claim 5 wherein said wear element calculator is further adapted to perform at least one calculation selected from a group consisting of:
    multiplying a nominal load by a segment distance and by a live motor indicator;
    multiplying a relative humidity by a segment distance and by a live motor indicator;
    squaring a relative humidity to yield a squared relative humidity, and multiplying said squared relative humidity by a segment distance and by a live motor indicator;
    multiplying an ambient temperature by a segment distance and by a live motor indicator;
    multiplying a precipitation indicator by a segment distance and by a live motor indicator;

multiplying a dead motor indicator by a segment distance;

multiplying an average spring force by a segment distance;

calculating a gaining grade load; and calculating a losing grade load.

7. A method of estimating DC motor brush wear comprising:

calculating a plurality of wear elements from at least one environmental variable;

multiplying said wear elements by respective ones of a plurality of wear coefficients to yield a plurality of weighted wear elements; and summing said weighted wear elements to yield a brush wear estimate.

8. The method of claim 7 further comprising:

estimating said wear coefficients by linear regression on a data set comprising:
   a plurality of said wear elements; and
   a plurality of brush wear measurements.

9. The method of claim 7 wherein said at least one environmental variable is selected from a group consisting of: segment distance, nominal load, relative humidity, ambient temperature, precipitation indicator, dead motor indicator, live motor indicator, average spring force, gaining grade load, and losing grade load.

10. The method of claim 7 wherein calculating said plurality of wear elements comprises at least one step selected from a group consisting of:

multiplying a nominal load by a segment distance and by a live motor indicator;

multiplying a relative humidity by a segment distance and by a live motor indicator;

squaring a relative humidity to yield a squared relative humidity, and multiplying said squared relative humidity by a segment distance and by a live motor indicator;

multiplying an ambient temperature by a segment distance and by a live motor indicator;

multiplying a precipitation indicator by a segment distance and by a live motor indicator;

multiplying a dead motor indicator by a segment distance;

multiplying an average spring force by a segment distance;

calculating a gaining grade load; and calculating a losing grade load.

11. A method of estimating DC motor brush wear comprising:

calculating a plurality of wear elements from at least one environmental variable selected from a group consisting of: segment distance, nominal load, relative humidity, ambient temperature, precipitation indicator, dead motor indicator, live motor indicator, average spring force, gaining grade load, and losing grade load;

multiplying said wear elements by respective ones of a plurality of wear coefficients to yield a plurality of weighted wear elements;

summing said weighted wear elements to yield a brush wear estimate; and estimating said wear coefficients by linear regression on a data set comprising:
   a plurality of said wear elements; and
   a plurality of brush wear measurements.

12. The method of claim 11 wherein calculating said plurality of wear elements comprises at least one step selected from a group consisting of:

multiplying a nominal load by a segment distance and by a live motor indicator;

multiplying a relative humidity by a segment distance and by a live motor indicator;

squaring a relative humidity to yield a squared relative humidity, and multiplying said squared relative humidity by a segment distance and by a live motor indicator;

multiplying an ambient temperature by a segment distance and by a live motor indicator;

multiplying a precipitation indicator by a segment distance and by a live motor indicator;

multiplying a dead motor indicator by a segment distance;

multiplying an average spring force by a segment distance;

calculating a gaining grade load; and calculating a losing grade load.

\* \* \* \* \*